R. C. SCHERLING.
END PLATE FOR THE SPINDLE CYLINDERS OF COTTON HARVESTING MACHINES.
APPLICATION FILED DEC. 29, 1910. RENEWED NOV. 7, 1914.
1,121,294.
Patented Dec. 15, 1914.
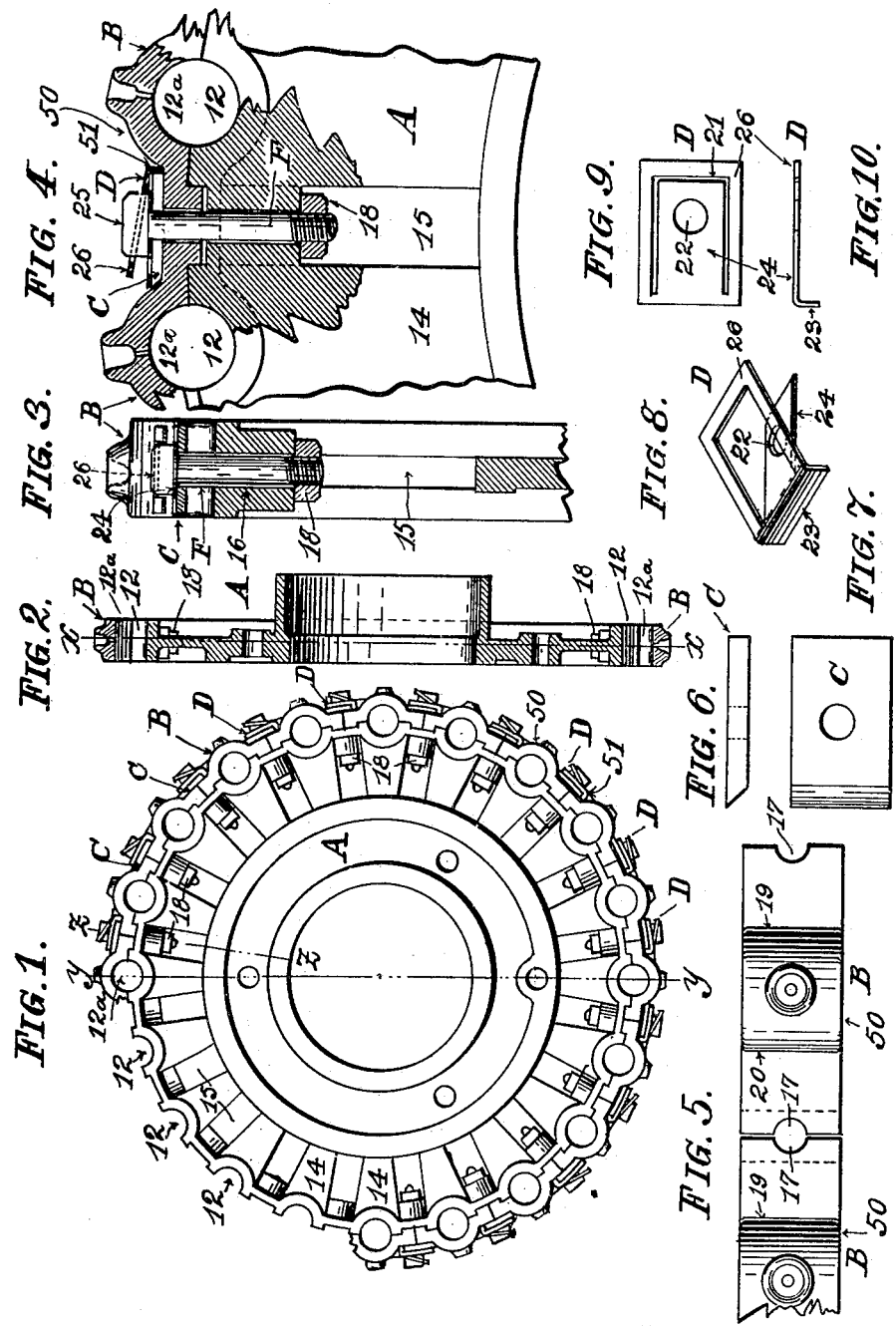
Witnesses:
E. B. Knudsen
A. S. Peterson
Inventor:
Rudolph C. Scherling.
By Michael J. Stark & Sons,
Attorneys.

UNITED STATES PATENT OFFICE.

RUDOLPH C. SCHERLING, OF CHICAGO, ILLINOIS, ASSIGNOR TO HENRY E. BULLOCK AND JAMES E. BULLOCK, OF CHICAGO, ILLINOIS.

END PLATE FOR THE SPINDLE-CYLINDERS OF COTTON-HARVESTING MACHINES.

1,121,294.          Specification of Letters Patent.        Patented Dec. 15, 1914.

Original application filed February 19, 1910, Serial No. 544,925. Divided and application filed December 29, 1910, Serial No. 599,813. Renewed November 7, 1914. Serial No. 870,934.

*To all whom it may concern:*

Be it known that I, RUDOLPH C. SCHERLING, a citizen of the United States, and resident of Chicago, in Cook County, Illinois, have invented certain new and useful Improvements in End Plates for the Spindle-Cylinders of Cotton-Harvesting Machines, (being a division of the application for patent filed by me February 19, 1910, Serial No. 544,925;) and I do hereby declare that the following description of my said invention, taken in connection with the accompanying sheet of drawings, forms a full, clear, and exact specification, which will enable others skilled in the art to which it appertains to make and use the same.

This invention has general reference to cotton harvesters; and it consists, essentially, in the novel and peculiar combination of parts and details of construction, as hereinafter first fully set forth and described, and then pointed out in the claims.

In the drawings already referred to, which serve to illustrate this invention more fully, Figure 1 is an elevation of one of the cylinder heads in which the columns carrying axially rotating picking spindles are mounted. Fig. 2 is a sectional view of the same on line $y\, y$ of Fig. 1. Fig. 3 is a similar view on an increased scale of a fragment of the said cylinder head on line $z\, z$ of Fig. 1. Fig. 4 is an elevation, partly in section, of a portion of the same, the sectional portion being on line $x\, x$ of Fig. 2. Fig. 5 is a plan of two adjacent bearing-caps detached. Fig. 6 is an end view of one of the retaining washers employed in connection with the bearing caps. Fig. 7 is an inverted plan of the same. Fig. 8 is a perspective view of one of the locking washers. Fig. 9 is a plan of the same, and Fig. 10 is an end view thereof.

Like parts are designated by corresponding symbols and characters of reference in all the figures.

The object of the present invention is the improvement of cotton picking machines to overcome certain defects therein which experience in actual use of such a machine in the cotton fields has disclosed, the said improvements being especially directed to the cylinder in which the columns with their axially rotating picking spindles are mounted. And in order that these improvements be thoroughly understood, I refer to the parent application already cited for a brief disclosure of the class of cotton harvesters to which these improvements are applicable.

A, in the drawings designates one of the end-plates of the cylinder, the periphery of which is provided with a series of semicircular depressions 12, forming half-bearings for the columns. Midway between these bearings 12 there are, in the web 14, openings 15, and leading from the periphery of the cylinder-head into these openings 15, there are bolt-holes 16, indicated in Fig. 3. Upon the periphery of the cylinder-head there are located as many bearing-caps B, as there are semi-circular depressions 12 in said periphery, each cap having a semicircular depression 12ª, forming in conjunction with the semicircular depressions 12, a complete bearing for the trunnions of the columns. In the ends of these caps B there are semicircular notches 17, corresponding in position to that of the holes 16, two of these semi-circular notches 17 forming a complete bolt-hole for the passage of a machine-bolt F, passing through said caps and the bolt-hole 16 into the opening 15, in which the nut 18 of the bolt F is located, and which nut fits the sides of the said opening 15 by an easy fit, but is prevented from rotating by its two sides bearing against the sides of the openings 15. Upon the adjacent flanges of the bearing-caps are located oblong washers C, shown in detail in Figs. 6 and 7, said washers bearing with one end against one side, 19, of the approximately semi-circular portion 50 of the caps B, the other end of said washers being shorter so as to leave a narrow space 51, Figs. 1 and 4, between the washer and the opposite portion 20, of said cap B.

D, designates a bolt-lock. It comprises a substantially rectangular plate shown in detail in Figs. 8, 9, and 10, in which plate there is a U-shaped incision 21, and a circular aperture 22, the latter aperture permitting of the passage of the bolt F. One end of this plate is bent at right angles, as indicated at 23, which bent portion is constructed to engage the space 51 between the end of the washer C and the portion 20 of the bearing-cap B, thereby preventing the plate D and the washer C from being misplaced. The inner portion 24, of the plate D, which has a bolt-hole 22, serves as a washer upon which the head 25 of the bolt F rests, while the outer, U-shaped portion 26 is adapted to be bent upwardly to embrace two opposite sides of the bolt-head 25, and thereby prevents the latter from turning.

In cotton picking machines of the class described there are a large number of gear wheels which, when the machine is in operation, cause considerable vibration of the machine-parts, which has a tendency to slacken bolts and nut, and to cause them to drop out of position and be caught in the machine-parts, resulting in damage thereto. This objection I have entirely overcome by the construction described, and I have attained the further advantage that instead of using the so-called cap-screws in the bearing caps, as has heretofore been the case, I am enabled to employ the much cheaper machine bolts, while at the same time I am enabled to remove any bearing cap B, by removing only two of these bolts without slackening any of the bolts in the adjacent caps.

Having thus fully described this invention, I claim as new and desire to secure to me by Letters Patent of the United States—

1. An end plate for the spindle-carrying cylinder of a cotton harvesting machine, comprising a circular disk, said disk having in its periphery a series of equally spaced, semi-circular depressions transversely to the flanks of said disk, there being between each depression an opening through said disk and a radially disposed bolt-hole reaching from the periphery of said disk into said opening, a cap for each of said semi-circular depressions comprising a semi-circular body having laterally-extending flanges, the said flanges being slotted at their ends, said semi-circular body having a semi-circular depression adapted to form in conjunction with a depression in the periphery of said disk a complete journal-bearing, a punctured plate overlying adjacent ends of said flanges, a bolt-locking device over said plate, and a bolt, the head of which overlies said locking device, and the screw-threaded shank of which passes through said locking device, said plate, and adjacent notches in said flanges, into the radially disposed bolt hole.

2. An end-plate for the cylinder of a cotton harvesting machine, comprising a circular disk, said disk having in its periphery a series of equally spaced semi-circular depressions transversely to the flanks of said disk, there being between each depression an oblong opening through said disk and a radially disposed bolt-hole reaching from the periphery of said disk into said oblong opening, a cap for each of said semi-circular depressions comprising a semi-circular body having lateral flanges, the said flanges being slotted at their ends, said semi-circular body having a semi-circular depression forming, in conjunction with a depression in the periphery of said disk, a complete bearing, a punctured plate overlying adjacent ends of said flanges, a bolt-locking device over said plate, a bolt, the head of which overlies the said locking device and the shank of which passes through said locking device, the plate, the adjacent ends of said flanges, and the radially disposed bolt-hole into said oblong opening, and a nut on the screw-threaded end of said bolt, said nut being located in said oblong opening and prevented from rotation by the walls of said oblong opening.

In testimony that I claim the foregoing as my invention, I have hereunto set my hand in the presence of two subscribing witnesses.

RUDOLPH C. SCHERLING.

Witnesses:
RICHARD J. WUERST,
MICHAEL J. STARK.